April 12, 1955 J. H. DE W. WALLER 2,705,826
METHOD OF FORMING REINFORCED CONCRETE ARCHED STRUCTURES
Filed Nov. 14, 1950 4 Sheets-Sheet 1
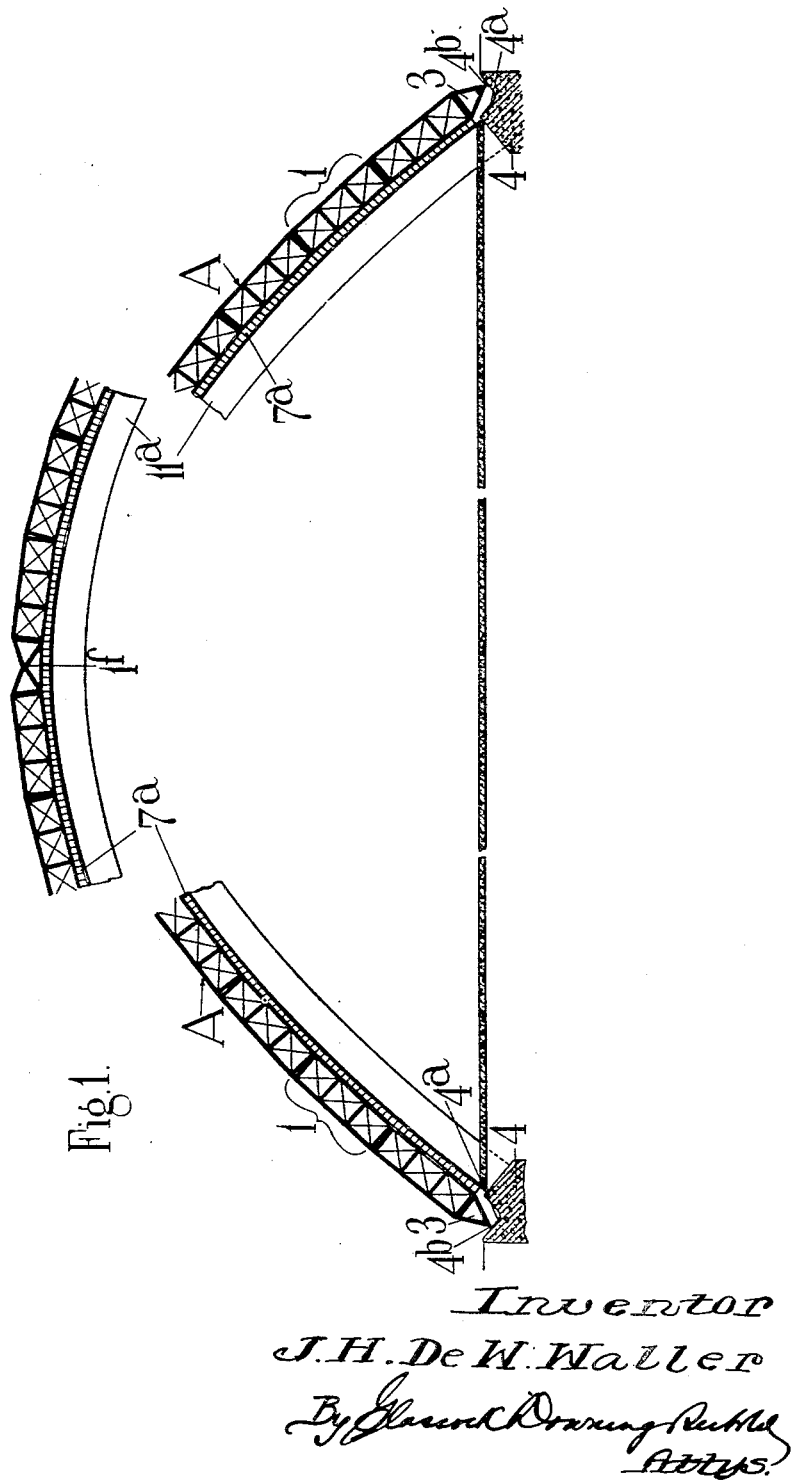

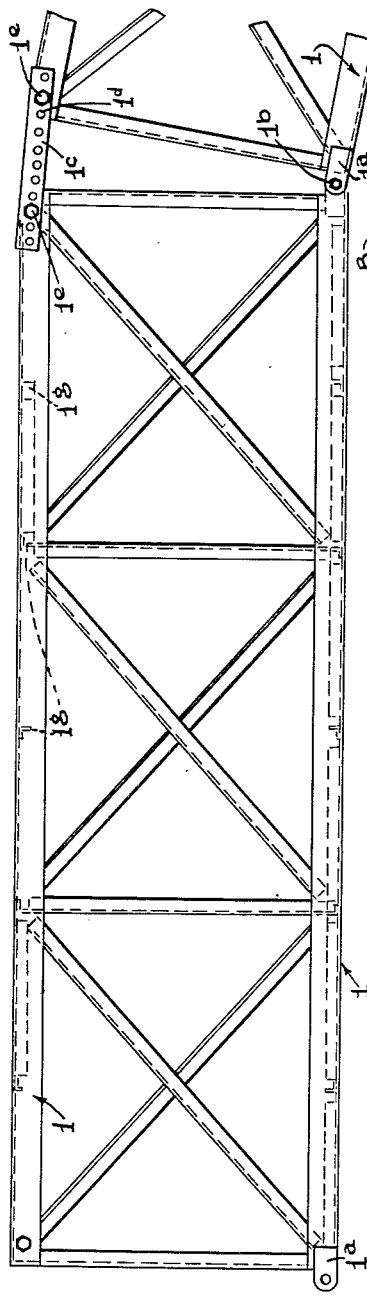
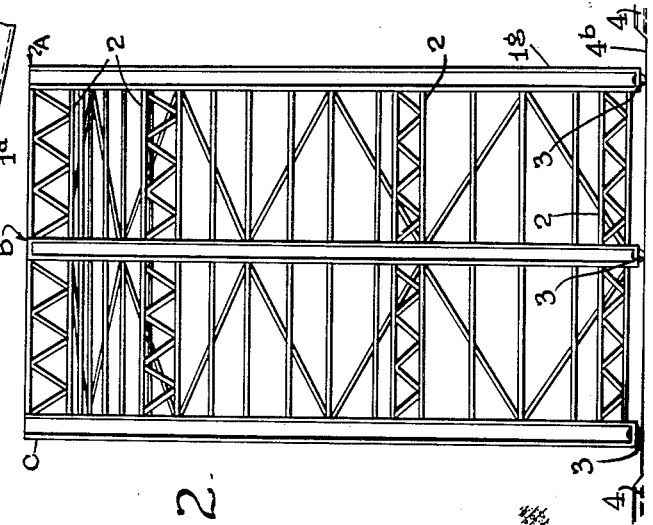
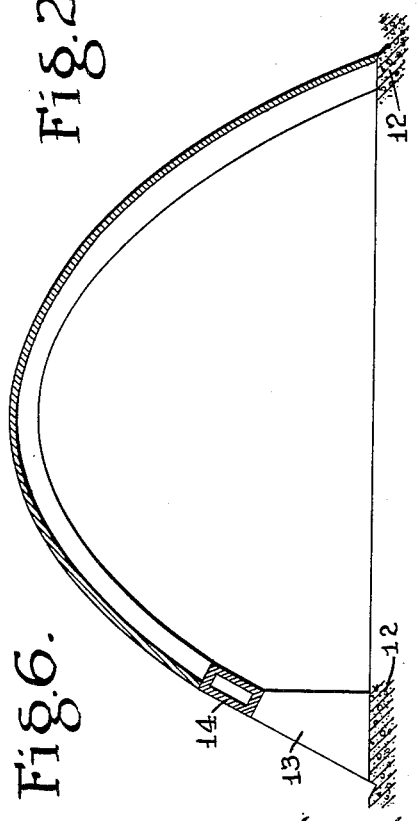

April 12, 1955 J. H. DE W. WALLER 2,705,826
METHOD OF FORMING REINFORCED CONCRETE ARCHED STRUCTURES
Filed Nov. 14, 1950 4 Sheets-Sheet 3
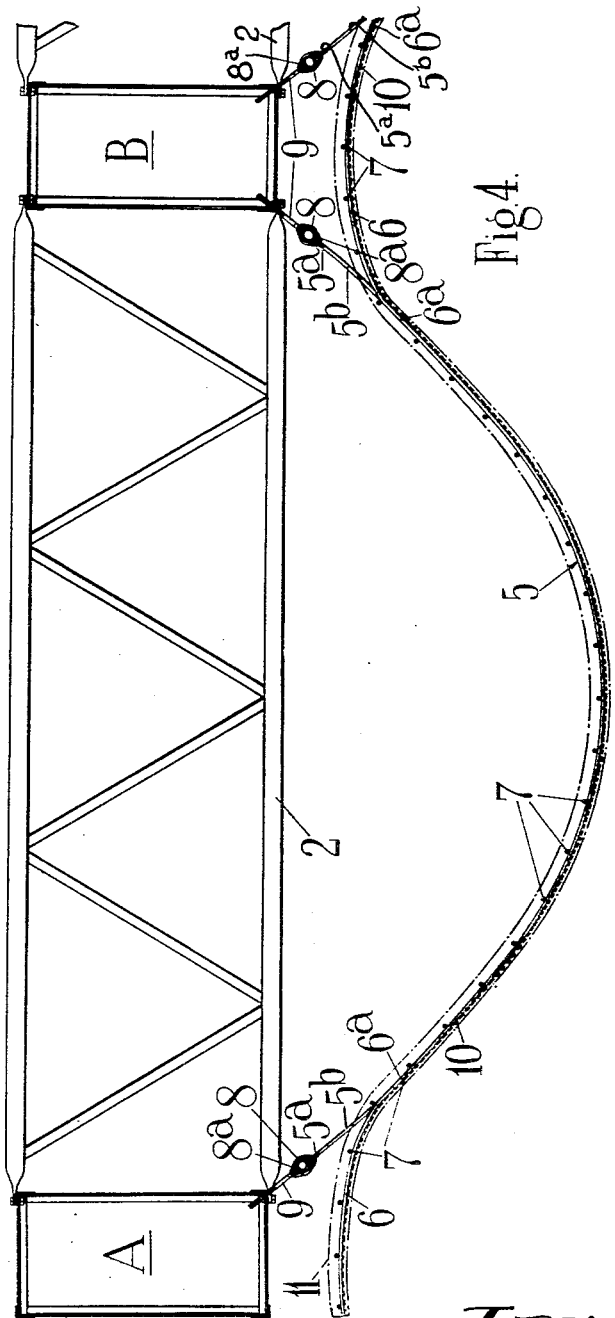

April 12, 1955     J. H. DE W. WALLER     2,705,826
METHOD OF FORMING REINFORCED CONCRETE ARCHED STRUCTURES
Filed Nov. 14, 1950     4 Sheets-Sheet 4

Inventor
J. H. De W. Waller

United States Patent Office 2,705,826
Patented Apr. 12, 1955

2,705,826

METHOD OF FORMING REINFORCED CONCRETE ARCHED STRUCTURES

James Hardress de Warrenne Waller, London, England

Application November 14, 1950, Serial No. 195,516

Claims priority, application Great Britain November 17, 1949

4 Claims. (Cl. 25—154)

There is a growing and urgent demand for large span structures of the order of from 100 feet to 500 feet (and possibly more) span for, among other purposes, protecting aircraft, particularly the larger types, from wind and weather conditions.

Very valuable aircraft, owing to lack of the required accommodation, not infrequently have to be parked in the open with all the attendant disadvantages. The erection of wind and weather constructions covering large areas by known methods and the conventional arched or other structural forms present technical problems and has always been very expensive, while with the increasing scarcity and cost of steel and other usual building materials such constructions are becoming prohibitive.

An aim of the present invention is to solve these problems and enable large span structures to be erected economically with the use of steel and other expensive materials reduced to a minimum, and according to the present invention the principles of wave form arched structures described in my application Serial No. 790,968, now Patent No. 2,616,149, are adapted and modified to enable the aim of the present invention to be carried into effect. In addition to providing protection suitable for aircraft, the invention affords facilities for the erection of wind and weather coverage for large scale storage or other purposes.

The invention consists in erecting in situ a wave form ctesiphon type arched structure by a method comprising: supporting flexible shuttering by light steel rod reinforcement including wave trough longitudinal members preformed to a catenarian shape, suspended from a temporary external arch or falsework unit (hereinafter called a gantry) and transverse ctesiphon arched members secured to said trough members such that the shuttering conforms to the catenarian wave form; uniting longitudinally adjacent trough members by preformed crest members; applying a coating of concrete, as by a cement gun, to the shuttering to include the reinforcement; allowing the concrete to set, and finally removing the suspension means for the reinforcement after the concrete is sufficiently set.

By the term "ctesiphon" as used herein and in the claims is meant an arch which as viewed spanwise extends in a curve which is an inverted catenary, the term being adopted from the well known ancient arch erected at Ctesiphon in Iraq, and is used conveniently to distinguish the curved span thereof from the catenary curvature of the troughs of the wave form.

The concrete may be applied to the intrados and/or the extrados of the shuttering and is suitably applied in more than one layer.

The flexible shuttering may be in the form of nonmetallic fabric such as hession or scrim, or it may be in the form of a metal network (such as expanded metal) and the concrete employed is preferably an appropriate mixture of sand and Portland cement.

It is preferred to erect the improved arch in longitudinal stages, that is to say, proceeding section by section, at right-angles to the span, and with this end in view the gantry is made to extend longitudinally over a corresponding selected section width; for example a gantry unit for including a section of two or more wave crests with the intervening troughs may be provided and mounted on wheels or skids for longitudinal traversal upon tracks preferably embodied in the footing foundation for the arch to be constructed.

The gantry may comprise a unitary frame including, for example, three arched series of box lattice girder members pitched at wave crest intervals and appropriately braced together to form archwork following the contour of but spaced above the arch to be erected. The gantry need not be stronger than such as is capable of sustaining its own weight plus that of the arch construction up to the stage when the concrete applied (usually the first layer) has set sufficiently to become self-sustaining.

The braced girder arches of the gantry may be conveniently built in transverse sections curved to the contour or arranged to follow the contour of the predetermined ctesiphon arch form and bolted together end to end (preferably by adjustable means), an initial series of, say, three or four such sections being completed and secured together at ground level while the additional sections are added progressively endwise one to another by raising the building end of the assembled sections as each section is added.

Each reinforced concrete arch erected according to the invention may be a complete arch symmetrical about the vertical longitudinal plane intercepting the crown of the arch. In this form of arch one end may be left open with the other end closed or closures may be provided for both ends, either or both of the closures being fitted with suitable large doors to afford endwise access. In an alternative form the arch may be asymmetrical having an abbreviated or fragmentary riser at one side supported upon a buttressed lintel extending longitudinally along the abbreviated side of the arch with the other (full) riser based on a footing foundation. This latter alternative is adapted to afford lateral access to the interior of the arched covering under the lintel either instead of or in addition to the endwise access.

By adopting the ctesiphon arch shape and catenarian wave form, a concrete arch is produced in which the uniform weight of the concrete is everywhere in direct compression, and the compressive stress is dependent only on the span and rise of the arch and not on its thickness. Hence, it is possible to construct arched forms of large span which according to conventional methods would require vast quantities of concrete and steel and expensive moulding apparatus.

The wave form shell with the catenarian troughs carried down to the footing, affords the stiffness required to ensure stability and resists superimposed loads tending to cause bending moments or tensile forces; in fact, the arch may be considered as a prestressed concrete structure which derives its prestressing from its own dead weight instead of by tensioning reinforcement.

In the accompanying drawings:

Figure 1 is an end elevation of an arch structure according to the invention with the arch form shown in fragments; the figure also illustrates an arcuate gantry for use in erection of the arch.

Figure 2 is a side elevation of a gantry as seen in Figure 1 for working upon a section of the arch structure comprising three wave crests.

Figure 3 is a side elevation (enlarged) of a portion of the gantry seen in Figure 1 and illustrates a mode of adjustably connecting the girder segments together.

Figure 4 is a fragmentary longitudinal section of the arch structure illustrating two wave crests and an intervening trough portion suspended from a gantry as seen in Figure 1.

Figure 6 is a cross section of the side entry arch structure seen in Figure 5.

Figures 5, 7:
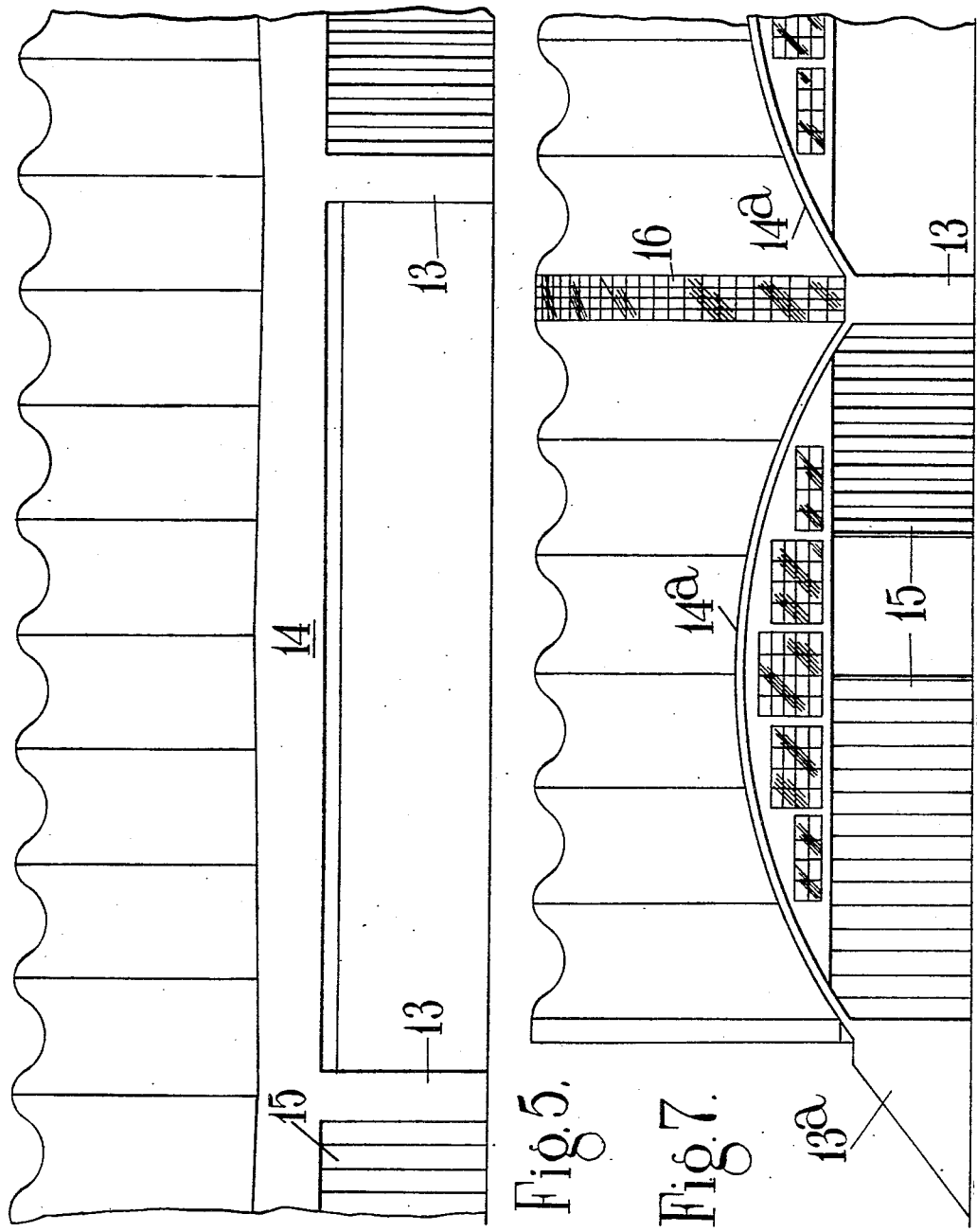
Figure 5 is a side elevation of an arch structure according to the invention in the form in which lateral entry is afforded by terminating one side of the arch at a longitudinal lintel supported on buttressed columns.
Figure 7 is a side elevation of a fragment of a side entry arch structure in which the lintel support is of arched form.

In carrying the invention into effect according to one mode as described by way of example with reference to the erection of a complete wave form arch of ctesiphon form (in front elevation) of, say, 200 feet and a crown height of about 60 feet, a gantry is employed for the erection of the arch. This unit is composed of lattice arch girders A, B, C, made in a series (for example ten) of box girder segments, these segments being either curved in correspondence with the curvature of the arch to be erected but of somewhat longer radius so that the falsework may be spaced clear of the arch to be erected, or alternatively the segments may be rectilinear and connected together so as to form fragments of a polygon which approximates in the general shape to that of the ctesiphon arch form. The girders or ribs A, B, C are pitched at intervals to correspond with the pitch predetermined for the wave crests of the arch structure to be erected, for example in the present instance a pitch of 20 feet or thereabouts. Assuming the gantry is intended to cover three wave crests, the segments of the three girders are braced together longitudinally of the arched structure and in construction the first segment 1 of the gantry arches A, B, C are braced together laterally by intermediate girders 2 so as to constitute a footing or springing part and alternate segments, the other seven segments 1 of the gantry arches A, B, C are braced together in a corresponding manner by intermediate girders 2. The braced segment units may conveniently be referred to as gantry sections.

According to one convenient way of erecting the gantry sections, numbers one and two are bolted together end to end at ground level and then the outer end of section two is raised and section three is added and bolted to section two after which the other gantry sections are added and bolted up stage by stage, the outer end of the previously connected gantry sections being raised to the appropriate height to allow the next section to be added and secured. After the addition of a section the completed archwork rests on the end of the last added section. The progressively completed arch may be conveniently raised stage by stage for the addition of gantry sections by an arrangement of lifting jacks or by the use of a crane or other lifting machinery. When the last section has been placed in position and bolted up, the falsework is complete. The lower end of the first section and of the last section is each provided with a bogie or wheeled carriage 3 for enabling the gantry to be traversed longitudinally of the side of the arch to be constructed on a suitable track.

The segments may be secured together endwise by providing them with eyed lugs 1a traversed by bolts 1b at their inward side while at the outward or upper side they are connected by plates 1c which have a series of apertures 1d for the selective reception of bolts 1e.

The crown segments of the gantry may, if desired, be provided with triangular ends connected together by a hinge pin 1f. The box segments 1 may have transverse angle bars 1g disposed ladderwise for convenience of access by workmen and additional tubular transverse and diagonal braces are provided between the sections of the arch girders A, B, C.

The site of the arch to be constructed is prepared by providing at the extremity of the intended span, a suitable concrete footing foundation 4 and it is preferred to provide on the said foundation a track 4a at right-angles to the neutral axis of the gantry arch and on which rails 4b for the carriage 3 are mounted lying externally of the footing foundation. The wheeled gantry is adapted to act as scaffolding for the subsequent erection and temporary suspension of the reinforcement and may be provided with any suitable staging for the accommodation and convenience of the workmen who are to erect the concrete arch, although the girder bracings and other members may be conveniently used by workmen.

The first step in erecting the concrete arch is the laying of reinforcement in the foundation for connection to the reinforcing members to be suspended from the gantry. This latter reinforcement comprises a series of identical trough rods preformed to the predetermined catenarian curve and a series of sets of transverse, preferably continuous, steel rods each set of which follows the ctesiphon arched curvature along a crest and troughs of the predetermined wave form. The trough rods and the sets of transverse arched reinforcing rods are suspended by wire or other hangers at a vertical interval from the girders of the gantry as described below, with the trough rods located in planes normal to the neutral axis of the arch from footing to footing.

According to the preferred mode of erection of the arched structure by the aid of a gantry such as above described, the requisite number of trough reinforcing rods 5 (hereinafter called "sag rods") on which the flexible shuttering is supported, are prepared by bending lengths of some 21 feet of half-inch diameter rodding to a true catenarian curve corresponding with a selected 5-foot amplitude wave form and providing at both ends of each rod a suspension hook 5a. These sag rods 5 are for location at, say, 12-inch centres in the troughs of a wave form of some 20 feet crest to crest pitch. A similar number of half-inch diameter crest rods 6 are also bent to suitable crest shape for welding to the sag rods 5 and forming rounded crests into which the sag rods merge as at 6a, the welding point. The end portion 5b of the sag rods project upwardly out of the wave form for convenience in suspending them in the true position.

For the reinforcing members at right-angles to the sag and crest rods, lengths of half-inch diameter rods are provided and may be referred to hereinafter as "arch rods." These rods are designated 7 in the drawings and are preferably of such length that they extend continuously from footing to footing over the arch and need not be pre-bent, as the curvature per foot is so slight that they will deflect to the required curvature in positioning them. The suspension or supporting means on the gantry for the sag rods conveniently comprises a series of tubes (or a continuous arched tube) 8 on which eye members 8a are welded at the pitch predetermined for the sag rod intervals. The sag rods are secured by their hooked ends to one side of the eyes 8a which at their other side serve as suspension attachments to the gantry ribs A and B (Figure 4), each of which has a suitable series of adjustable hook bolts 9 loosely located in holes at the lower corners of the ribs. The sag rods may be raised into position by two men on the gantry hauling on the curved sag rods at both ends and then hooking them to the eyes 8a. In order that the bolt nuts do not foul the rib corners triangular chocks may be inserted on the bolt ends. The disposition of the suspension means for the sag rods with respect to the curve of the arch (before their release by severance as referred to hereinafter) is diagrammatically indicated in Figure 1 at 7a.

The sag rods adjacent the crown of the arch are positioned first, a pair being suspended one on each side of said crown. This pair of rods is guyed together, that is to say they are linked laterally together by guys which are conveniently in the form of wires of a length corresponding with the interval predetermined for the pitching of the sag rods, and having their ends bent to hooked form to engage over the sag rods. A second pair of sag rods is now added, one on each outward side of the first pair and linked by guys to the crown pair of sag rods. Further sag rods are installed on each side of the crown in succession down to the footings of the arch so that the addition of sag rods proceeds in a balanced manner, each succeeding sag rod being linked by hooked guys to the rod previously installed. By this linking arrangement sag rods of equal amplitude are temporarily held in socalled radial planes, that is to say in planes normal to tangents to the arch at the points of intersections by said planes.

With the sag rods in position, a suitable number of locating arch rods 7 are laid over the sag rods. These arch rods extend along the arch form from footing to footing where they are secured to attachment members embedded in and extending from the concrete foundations 4. These arch rods are welded or wired to the sag rods at the intersections and serve initially to secure the parallel arrangement of the sag rods. At this point it is suitable to connect the sag rods of adjacent troughs together by means of the crest rods 6, which after location are welded laterally at their ends to the sag rods at the points already indicated. The residual number of arch rods are added and laid over the crest and sag rods and welded or wired thereto at the points of intersection. The arch rods are spaced throughout the wave form at 12-inch intervals, affording with the sag and crest rods a continuous mesh reinforcement.

To this mesh formed by the rods 5, 6 and 7, and on the underside thereof, sheets or lathing of expanded metal of suitable gauge is secured by wire binding or otherwise, to constitute the flexible shuttering hereinbefore referred to. This expanded metal flexible shuttering is indicated at 10 in Figure 4 and eventually becomes embedded in the concrete.

The concrete for the structure is suitably a mixture of Portland cement and sand and is preferably shot on to the expanded metal by a cement gun by men working from the gantry. Starting at the springing on both sides of the arch, a layer of concrete about 1½ inches thick is applied to the top of the expanded metal 10, the layer being sufficiently thick to bury the rod reinforcements 5 and 7. A second layer is then applied over the first layer to make a total thickness of concrete not less than 2½ inches. The concrete need not be of uniform thickness as, if desired, the thickness may be increased in the bottom of the troughs and the tops of the crests. In order that the concreters should not disturb the concrete in applying such, a travelling cradle shaped to the trough form may be slung between the girder ribs of the gantry and is readily moved up a few feet at a time as concreting proceeds.

When the laid concrete 11, Figure 4, has sufficiently matured, the projecting ends 5b of the sag rods are cut off, thus releasing the moulded arch from the gantry. A further small quantity of concrete is gunned over the crests to cover the sag rod ends and the underside or intrados of the expanded metal (to complete the protection thereof) is gunned with concrete from a travelling scaffold erected inside the arch. The intrados of the concrete of a wave trough is seen in elevation in Figure 1 at the reference 11a.

The gantry is now traversed longitudinally of the arch on its wheeled carriage 3 along the tracks 4b into a position to erect the next longitudinal section of the arch comprising three waves crests with intervening troughs. The rodwork reinforcement 5, 6 and 7 to form the rodding mesh to which the expanded metal 10 is attached, is carried out and followed by the concreting as described above. The erection of the rest of the arch tunnel proceeds in like manner section by section.

Each section may be made continuous with the preceding section by providing the necessary metal connections between the reinforcement of one section and those of the next, or alternatively each section may be independent, being separated at the wave crests by expansion joints, or a gap may be left at these points for the insertion of glazing units which effectively may constitute roof lighting and expansion joints.

According to a modification, the reinforcing rods for a section of the work, that is to say, for example for three crests and two intervening troughs, may be continuous, the troughs and the crests form being bent into the lengths of rod and hoisted in position but such rods are somewhat unmanageable and liable to distortion in fixing, and accordingly it is preferred to separate the trough rods from the crest rods and secure the two together by welding or wiring.

In another modification, instead of positioning the arch rods over the sag rods and crest rods they may be welded or tied to the wave form reinforcement underneath such, and similarly the expanded metal for the flexible shuttering may be positioned either above or below the said reinforcement which forms a rodding network. It is preferred or is more convenient to apply the concrete from the exterior or over the extrados of the metal work, but the concrete may, if desired, be shot from the inside of the structure and applied to the intrados of the expanded metal, or alternatively a preliminary layer may be applied to the expanded metal from the inside and the residue of the concrete applied from the outside of the arch.

For the flexible shuttering expanded or network metal has been designated above in the carrying out of the invention and such is preferred, it constitutes in itself a supplemental reinforcement, but hessian, scrim or like non-metallic fabric may be employed for the shuttering in place of the expanded metal more particularly where the span of arch concerned is towards the lower end of the range above mentioned.

Assuming that the arch is to remain open at the other end a suitable walling construction is erected to close the arch tunnel and is mated with the arch. If the tunnel is to be closed then one end or both ends are provided with suitably large doors mounted in framing to fit the arch, to afford endwise access.

In carrying the invention into effect according to a modification (see Figures 5 and 6) wherein the springing and one side of the arch tunnel is supported upon a lintel instead of a footing foundation, a suitable concrete foundation 12 is provided on which is erected a series of transverse buttress columns 13. The spacing interval of the buttresses is arranged to accord with the longitudinal dimensions of the access to be provided and structural requirements for the lintels for example where an entry of 150 feet wide is to be afforded then a pair of buttresses may be arranged close together at the extremity of the access width.

Upon these buttresses a continuous box form lintel or beam 14 is erected in reinforced concrete and the upper side of this lintel is adapted to form the footing for the extremity of the abbreviated arch to be constructed. The arch rods are laid and secured in this box girder lintel while the other or normal footing ends of the arch rods are secured in a footing foundation laid in the ground at the other side of the arch structure.

The arch rod, sag rod and expanded metal shuttering are of similar character and are laid in a similar manner to those described above in connection with the full arch form and after the erection of the lintel arrangement the work proceeds in the same manner as already described with a gantry disposed for sectional treatment in the laying of the reinforcement and the concrete of the shuttering.

Where access is intended to be solely at the lintel side of the arch tunnel both ends of the arch tunnel may be closed by walling in any suitable way and sliding or other doors 15 are provided between the buttresses or certain of them while the space between others may be filled in with walling. If in addition to the side access end access is required to the arch tunnel, a suitable walling is erected at one or both ends with appropriate access doors.

Although a rectilinear lintel for the purpose of supporting the springing of the fragmentary form arch where lateral access to the building is required has been described above it may be desirable or convenient to employ a lighter or less massive type of lintel construction, and with this end in view lintel members of arched form are provided (see Figure 7), that is to say, a series of buttresses 13 are erected on the foundation at the side of the building at suitable intervals, and these are spanned by reinforced concrete arches 14a of normal construction to constitute a multi-arched supporting lintel for the springing of the main arched structure. For example, for a building which extends longitudinally, say 900 feet, seven buttresses may be erected with six spanning arched lintels, the span of the arches being about 150 feet. It will be appreciated that while the arches intermediate the ends balance one another at the common buttresses, the thrust of the arched members of the ends of the structure may be taken on supplementary longitudinally positioned buttress forms 13a which are reinforced by supplemental longitudinally extending buttresses.

At the wave crests or certain of such, expansion joints may be provided, and in the vertical plane of the buttress arched roof lighting, as seen exemplified at 16 (Figure 7) may be introduced, at which expansion jointing may also be employed.

With regard to arches of other or larger spans than that exemplified above in the carrying out of the invention, the following ratios of the dimensions are given to serve as a guide: Height at crown, one-third of the span; pitch of the wave crests, one-tenth of the span; amplitude of wave form, one-quarter pitch of crests.

With regard to the amount of reinforcement and the diameter of the rodding employed in the arch structure, these factors may be varied according to circumstances, such as for example abnormal wind pressures and/or range of temperature changes to which the structure may be subjected. Furthermore, it will be appreciated that, if extra or additional loads are to be imposed on the arch structure, such as would occur when internal gantries or hoisting machinery were required when the structure was in use, the necessary additional reinforcement would have to be provided for by the designer.

I claim:

1. A method of erecting in situ a ctesiphon arch structure suitable for a span of the order herein indicated and comprising a concrete arch shell extending longitudinally at right-angles to the span in a wave catenary trough and crest form without any arch beams, girders or falsework extending from footing to footing, permanently or temporarily on the interior side of the shell beneath the wave crests comprising: positioning a gantry, longitudinally displaceable as a unit in a rectilinear path, over the arch site and extending longitudinally thereof over a section including a series of wave crest pitch positions and vertically spaced from said wave crests; positioning a series of sag reinforcing rods each to a predetermined catenary for the respective wave troughs; positioning a corresponding series of crest reinforcing rods to the predetermined curvature for arcuate wave crests; connecting the ends of the sag rods to suspension means depending from the gantry so that the rods are hung therefrom in positions according with the pitch of the series of wave crests within the longitudinal section of the arch covered by the gantry, and locating such rods in planes normal to tangents to the ctesiphon arc; securing said crest rods to longitudinally adjacent sag rods to produce a longitudinally continuous reinforcement of wave form including a series of wave crests; laying rods extending from footing to footing externally over and crossing the sag and crest rods at substantially right angles and securing the rods together at their intersections to form a reinforcement network; attaching flexible mesh shuttering to the reinforcement network; applying concrete to the shuttering to include said network; disconnecting the suspension of the sag rods from the gantry after the concrete has sufficiently set, traversing the gantry in a longitudinal path to bring it into position for erecting the next arch section; securing the last sag rods laid to those of the crest rods of the new section, and repeating the above steps of laying reinforcement, shuttering and concrete section by section to the completion of the predetermined length of arch structure to be erected.

2. A method as claimed in claim 1 including providing sag rods in lengths longer than that required for the catenary wave troughs, suspending the sag rods from the gantry by their ends with the excess length of the rods projecting above the wave crest positions, and subsequently removing such excess length after the concrete has set when disconnecting the suspension of the sag rods from the gantry.

3. A method as claimed in claim 1 and wherein sag rods with hooked ends are provided in lengths longer than the caternary curve of the wave troughs and eye members are provided depending from the gantry, comprising suspending the sag rods with the excess length projecting above the wave crests, hooking the ends of the sag rods to the eye members, and subsequently removing such excess length after the concrete has set by severing the hooked ends of the rods at the level of the concrete.

4. A method as claimed in claim 1 and wherein arch tubes are provided of greater radius than that of the arch structure to be erected, each having a series of eye members welded thereon at wave crest pitch, comprising suspending pairs of such arch tubes from the gantry in spaced relationship with respect to the wave crest positions with one of each pair located on either side of the apex of a wave crest, and attaching the ends of the sag rods to said eye members of the arched tubes.

References Cited in the file of this patent

UNITED STATES PATENTS

| | | |
|---|---|---|
| 1,238,456 | Taylor | Aug. 28, 1917 |

FOREIGN PATENTS

| | | |
|---|---|---|
| 545,334 | Great Britain | May 20, 1942 |
| 631,553 | Germany | June 23, 1936 |
| 665,245 | France | May 6, 1929 |

OTHER REFERENCES

Construction Methods, April 1937, page 46.